United States Patent [19]

Silvers

[11] Patent Number: 5,121,933
[45] Date of Patent: Jun. 16, 1992

[54] GASKET WITH IMPROVED SEALING CAPABILITIES

[75] Inventor: Paul L. Silvers, Woodhaven, Mich.

[73] Assignee: McCord Payen Inc., Ann Arbor, Mich.

[21] Appl. No.: 653,080

[22] Filed: Feb. 8, 1991

[51] Int. Cl.⁵ .............................................. F16J 15/12
[52] U.S. Cl. ................................ 277/235 B; 277/166; 277/189; 277/235 R
[58] Field of Search ........... 277/235 R, 235 A, 235 B, 277/232, 234, 166, 189

[56] References Cited

U.S. PATENT DOCUMENTS

| | | | |
|---|---|---|---|
| 3,448,986 | 6/1969 | Jelinek et al. | 277/235 B |
| 3,841,289 | 10/1974 | Meyers | 277/235 B |
| 4,213,620 | 7/1980 | Kennedy et al. | 277/235 B |
| 4,290,616 | 9/1981 | Nicholson | 277/234 |
| 4,630,835 | 12/1986 | Locacius | 277/235 B |
| 4,723,783 | 2/1988 | Belter et al. | 277/235 B |
| 4,783,087 | 11/1988 | DeCore et al. | 277/166 |
| 4,955,621 | 9/1990 | Skrycki | 277/166 |

OTHER PUBLICATIONS

Fel-Pro Gasket Part No. E6ZE-6051-A5A (no date available).

*Primary Examiner*—William A. Cuchlinski, Jr.
*Assistant Examiner*—Daniel G. DePumpo
*Attorney, Agent, or Firm*—Harness, Dickey & Pierce

[57] ABSTRACT

An improved head gasket particularly for multi-cylinder V-type internal combustion engines for motor vehicle applications in which the gasket defines one or more leg extension areas. The extension area features an extension seal attached to the main head gasket material and is preferably formed from a perforated metal carrier sheet which supports a bead of elastomeric material formed on both face surfaces of the carrier sheet. The extension seal serves as an energy absorber to reduce the likelihood of over-compression of the head gasket during installation of the cylinder head onto the engine block. The extension seal further provides a high degree of tolerance to changes in gap separation between the sealing surfaces of the cylinder head and engine block, thereby providing an effective seal against gasket leakage.

9 Claims, 1 Drawing Sheet

GASKET WITH IMPROVED SEALING CAPABILITIES

BACKGROUND AND SUMMARY OF THE INVENTION

This invention is related to a sealing gasket and particularly to one adapted for use as a head gasket for motor vehicle internal combustion engines.

Conventional internal combustion engines for automotive applications require a head gasket between the engine block and the cylinder head for purposes of sealing against leakage of combustion gasses from the cylinder and, further to prevent leakage from cooling jacket passages and oil from the engine crankcase. While head gaskets have been used from the earliest days of internal combustion engines, designers of these gaskets are constantly striving to improve their performance, reliability, and reduce their costs. Present head gaskets are made from various materials such as a lamination of graphite foil facing material onto a tanged perforated steel core.

Although the newer gasket materials possess excellent sealing characteristics, gasket leakage remains a problem in certain areas of the head gasket. In V-type engines, the head gasket often includes a pair of extending "legs" extending at the ends of the gasket toward the centerline of the engine which are narrow extending surfaces where a seal must be provided between the cylinder head and block. If an effective seal is not provided in the leg areas, crankcase oil can leak outside the engine, giving rise to warranty claims, crankcase oil loss, and customer dissatisfaction.

Head gasket leakage in the leg areas is a particular concern in view of a number of factors. During the process of loading the cylinder head onto the engine block during production, the head is dropped into position, giving rise to areas of high gasket loading caused by the impact between the head and block. Due to the fact that the legs extend from the block such excess loading is particularly prevalent in the leg areas of the head gasket. The relatively small area of the leg portion means that the impact loads are necessarily concentrated. Composite gasket materials, like virtually any gasket material, have certain limitations in their ability to rebound after compression. In some instances, the impact encountered during cylinder head loading and installation are significant enough to prevent the gasket material from recovering to the degree necessary to provide sealing.

Another area of concern in the head gasket leg region is related to the fact that it is adjacent to the intake manifold sealing surface of the cylinder head. Typically, the cylinder head is first torqued to the engine block and thereafter the intake manifold is installed and torqued. Since the intake manifold is attached to both heads, the process of mounting the intake manifold can cause regions of the cylinder head to be lifted away from the head sealing surface on the sealing block. Further sealing problems arise due to thermal expansion of the intake manifold which often tends to lift the head from the block. Furthermore composite gasket material exhibit a mounting bolt clamp load loss over time, meaning that gasket clamping pressures are reduced, further reducing sealing effectiveness.

The previously mentioned sealing problems which exist when using conventional head gaskets are addressed by the gasket in accordance with the present invention. The gasket of this invention has a main body portion which can be virtually identical to existing head gaskets in shape and can be made of lamination of conventional gasket material such as graphite foil on a tanged perforated core. The present gasket, however, differs from prior art designs in that it features separate specially made sealing elements for the leg extension areas, preferably comprised of a perforated metal sheet which is attached to the main body of the head gasket. The extension seal carries a bead of elastomeric material such as silicone rubber. The extension seal can be attached to the main body of the head gasket through clenching type fasteners or various other fastening approaches.

The provision of the leg extension seal of this invention provides a number of significant benefits. Due to the structural characteristics of the rubber-like material employed, the extension acts as an energy absorbing "bumper" which serves to reduce the likelihood of over-compression of the head gasket due to impact between the cylinder head and engine block. Moreover, the elastomeric sealing bead serves to provide a seal capable of a high degree of compression and recovery for sealing against the leakage of crankcase oil or other fluids across the head gasket leg extension area.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
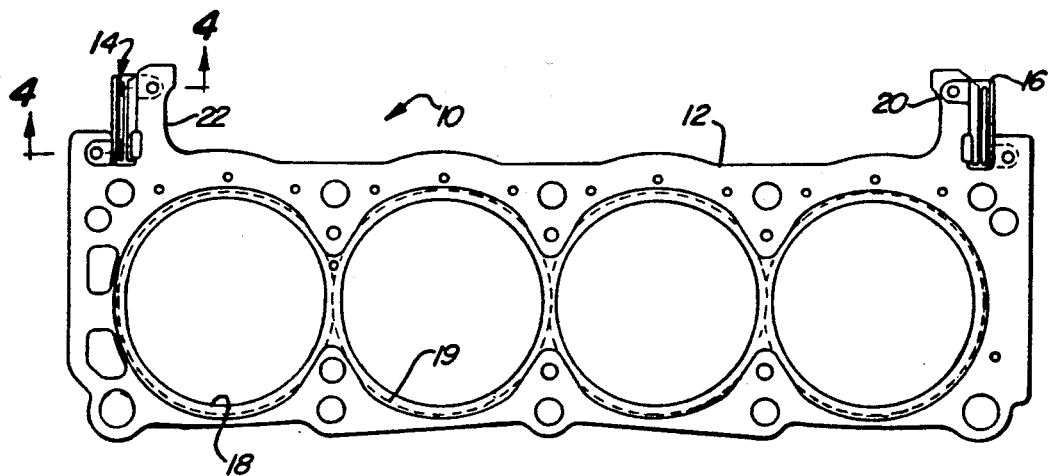
FIG. 1 is a plan view of a head gasket incorporating the features of the present invention.

A head gasket incorporating the features of the present invention is shown in FIG. 1 and is designated there by reference number 10. Head gasket 10 as shown is intended for use for sealing one of the two heads of an 8-cylinder V-type engine onto the engine cylinder block. With reference to the orientation of the head gasket shown in FIG. 1, the upper edge is intended to be oriented toward the inboard centerline of the engine (i.e. toward the intake manifold). Head gasket 10 is comprised of a main body portion 12 with a pair of attached extension seals 14 and 16.

The main body 12 of head gasket 10 is preferably made of a sealing material such as graphite foil on a tanged perforated metal core. In accordance with conventional head gasket design practices, the edges of cylinder bores 18 are reinforced by a metal sealing grommet 19. Various passages and holes are provided through head gasket 10, including clearance holes for head mounting bolts, and cooling jacket coolant passages, etc.

In prior designs head gaskets included a pair of extension leg areas which provided a seal preventing the leakage of crankcase oil in a direction from the center of the head gasket across the extension leg areas. The extension leg areas were formed by the gasket material making up the main body portion of the head gasket. The principle feature of this invention is the extension seals 14 and 16 which provide the sealing in the extension leg areas 20 and 22, respectfully. Extension seals 14 and 16 are shown in detail in FIGS. 2, 3 and 4.

Figure 2:
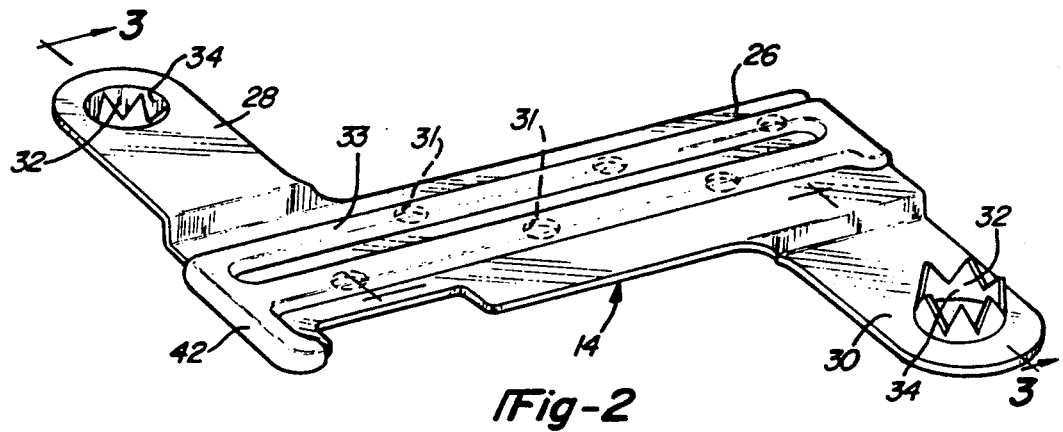
FIG. 2 is an enlarged pictorial view of the extension seal of the gasket shown in FIG. 1.
Figure 3:
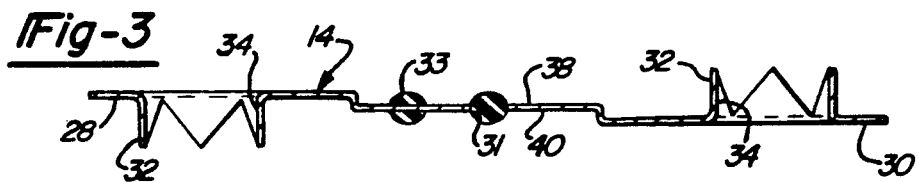
FIG. 3 is a cross-sectional view taken along line 3—3 of FIG. 2 showing the extension seal before it is fastened to the main gasket body.

Extension seal 14 is formed from a perforated metal carrier sheet 26 with a pair of mounting extensions 28 and 30. The perforations 31 of metal sheet 26 allow a bead of elastomeric material 33 such as silicone rubber, as best shown in FIG. 3, to be formed through the sheet. As shown in FIG. 2, bead 33 defines a closed elongated rectangle shaped pattern on metal sheet 26. In cross section as shown in FIG. 3, bead 33 defines a generally round cross sectional shape, with metal sheet 26 crossing through a diameter of the bead.

Portions of bead 33 extend from both face surfaces 38 and 40 of sheet 26 which are joined together through perforations 31. In addition, bead 33 can extend beyond the edge of sheet 26 to further strengthen its attachment to the sheet, as provided by bead portion 42 shown in FIG. 2. Bead portion 42 also provides a seal where extension seal 14 butts up against the main body 12 of the head gasket.

Figure 4:
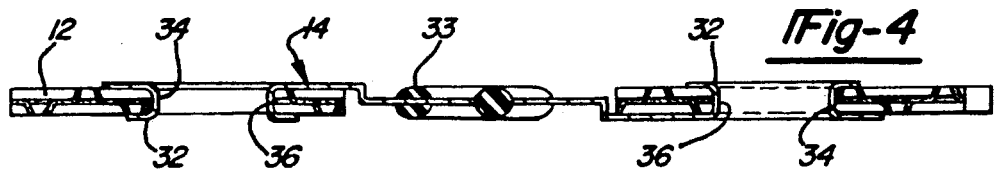
FIG. 4 is a cross-sectional view taken along line 4—4 of FIG. 1.

Mounting pads 28 and 30 are provided to allow extension seals 14 and 16 to be securely attached to head gasket body 12. Although various attachment schemes can be employed, as shown in the FIGS., a clenching or crimping type fastening approach is employed in a preferred embodiment of this invention. For this type of fastening, each of mounting pads 28 and 30 define an area which has intersecting slits defining leaves 32 which are deformed from the surface of metal sheet 26, leaving holes 34. The leaves 32 are installed through corresponding holes 36 in head gasket body portion 12 and are thereafter crimped securely as shown in FIG. 4 to cause extension seals 14 and 16 to be deformed into interlocking engagement with the remainder of the head gasket.

The extension seals 14 and 16 act both as energy absorbers to reduce compression of the remainder of head gasket 10 during installation of the head, and further serve as an efficient seal in the critical leg extension areas which is capable of accommodating a significant range in separation distance between the sealing surfaces of the cylinder head and engine block, thus preventing the leakage of crankcase oil from the engine. Although a particular pattern of an elastomeric bead 33 is shown in the FIGS. of this specification, this configuration is not critical and various others could be used which are well within the scope of this invention. Similarly, although a laminate construction head gasket having outer layers of graphite foil is disclosed for use in forming the gasket main body portion 12, this invention can be employed with numerous other head gasket materials. In addition, silicone rubber is identified as a preferred material for use in forming bead 33, but other materials could also likely be employed successfully for this application. As mentioned in this specification, extension seals 14 and 16 are provided to prevent oil from leaking across them. It should be understood, however, that extension seals 14 and 16 could also seal against fluid leakage from a closed passageway through the extension area, for example in the case of a cooling jacket passageway in that area.

While the above description constitutes the preferred embodiments of the present invention, it will be appreciated that the invention is susceptible of modification, variation and change without departing from the proper scope and fair meaning of the accompanying claims.

I claim:

1. A head gasket assembly for an internal combustion engine of the type having one or more extension leg areas projecting from the main body of the head gasket comprising:

an extension seal for preventing the leakage of engine crankcase oil across said extension leg area affixed to a main body portion of said head gasket and defining at least a portion of said extension leg area, said extension seal including a metal carrier sheet having a bead of an elastomeric material extending from both face surfaces of said carrier sheet, said bead extending along an edge of said carrier sheet and having a portion thereof extending beyond said edge.

2. A head gasket assembly for an internal combustion engine according to claim 1 wherein said carrier sheet is a perforated sheet of metal.

3. A head gasket assembly for an internal combustion engine according to claim 2 wherein said elastomeric sealing bead is formed through said perforated sheet, such that said bead extends from both major face surfaces of said carrier sheet and is joined through said perforations of said carrier sheet.

4. A head gasket assembly for an internal combustion engine according to claim 1 wherein said extension seal is affixed to a main body portion of said head gasket using a clench type fastener.

5. A head gasket assembly for an internal combustion engine according to claim 1 wherein said bead is made from silicone rubber.

6. A head gasket assembly for an internal combustion engine according to claim 1 wherein said extension seal carrier sheet defining two or more mounting pads each of which is fastened to a main body portion of said head gasket.

7. A head gasket assembly for an internal combustion engine according to claim 1 wherein said extension seal is fastened to a main body portion of said head gasket formed into a laminate having a graphite foil layer.

8. A head gasket assembly according to claim 1 wherein said carrier sheet defines a first edge which abuts said main body portion and wherein said bead extends beyond said first edge to enhance sealing against said body portion.

9. A head gasket assembly according to claim 1 wherein said carrier sheet defines a second edge further from said main body portion and wherein said bead extends beyond said second edge to seal against a component of said engine.

* * * * *